(12) United States Patent
Zhu et al.

(10) Patent No.: US 10,942,521 B2
(45) Date of Patent: Mar. 9, 2021

(54) METHOD AND APPARATUS FOR DETERMINING A VEHICLE CONTROL PARAMETER, VEHICLE ON-BOARD CONTROLLER AND AUTONOMOUS VEHICLE

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Qi Kong, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 180 days.

(21) Appl. No.: 16/265,775

(22) Filed: Feb. 1, 2019

(65) Prior Publication Data
US 2020/0103913 A1  Apr. 2, 2020

(30) Foreign Application Priority Data
Sep. 30, 2018  (CN) .......................... 201811161521.X

(51) Int. Cl.
*G05D 1/02* (2020.01)
*G05D 1/00* (2006.01)
(Continued)

(52) U.S. Cl.
CPC ........... *G05D 1/0221* (2013.01); *B60W 30/18* (2013.01); *B60W 50/00* (2013.01); *G05B 13/0265* (2013.01); *G05D 1/0088* (2013.01); *B60W 2050/0083* (2013.01); *B60W 2520/10* (2013.01); *B60W 2520/105* (2013.01); *B60W 2540/18* (2013.01)

(58) Field of Classification Search
CPC .................................................. G05D 1/0221
See application file for complete search history.

(56) References Cited

U.S. PATENT DOCUMENTS

2017/0301247 A1* 10/2017 Sherry ................. G08G 5/0021
2017/0327115 A1* 11/2017 Tokimasa .............. B60W 30/16
(Continued)

*Primary Examiner* — Alex C Dunn
(74) *Attorney, Agent, or Firm* — Seed IP Law Group LLP

(57) ABSTRACT

Embodiments of the present disclosure disclose a method for determining a vehicle control parameter, an apparatus for the same, a vehicle controller, and an autonomous vehicle. An embodiment of the method comprises: determining a current vehicle speed and an expected acceleration; determining, from a pre-generated parameter calibration table, a longitudinal control parameter corresponding to the current vehicle speed and the expected acceleration; wherein the parameter calibration table is obtained by: obtaining a training sample set, a training sample in the training sample set including the vehicle speed, the longitudinal control parameter and the acceleration; training a pre-established parameter calibration model with the vehicle speed and acceleration of respective samples in the training sample set as inputs and the longitudinal control parameter value in the training sample as an expected output; and obtaining the parameter calibration table based on the trained parameter calibration model.

13 Claims, 5 Drawing Sheets

(51) Int. Cl.
*B60W 30/18* (2012.01)
*B60W 50/00* (2006.01)
*G05B 13/02* (2006.01)

(56) References Cited

U.S. PATENT DOCUMENTS

| | | | |
|---|---|---|---|
| 2018/0257698 A1* | 9/2018 | Ryne | G05B 13/0265 |
| 2019/0106014 A1* | 4/2019 | Zhao | B60W 10/30 |
| 2019/0287388 A1* | 9/2019 | Salti | G01S 19/52 |
| 2020/0051347 A1* | 2/2020 | Bohl | G06N 7/005 |
| 2020/0090504 A1* | 3/2020 | Kadar | G08G 1/0112 |
| 2020/0094851 A1* | 3/2020 | Smye-Rumsby | B60W 50/14 |

* cited by examiner

METHOD AND APPARATUS FOR DETERMINING A VEHICLE CONTROL PARAMETER, VEHICLE ON-BOARD CONTROLLER AND AUTONOMOUS VEHICLE

TECHNICAL FIELD

Embodiments of the present disclosure relate to the field of automatic driving, specifically relate to the field of vehicle control, and more particularly relate to a method for determining a vehicle control parameter, an apparatus for the same, a vehicle on-board controller and an autonomous vehicle.

BACKGROUND

In the field of automatic driving, autonomous control of a vehicle is usually done through a vehicle brain when the vehicle is in a self-driving state. Specifically, a control module in the vehicle brain may also generate a control instruction based on ambiance parameters collected by the sensor and vehicle control parameters, thereby reaching a corresponding control indicator, e.g., causing the vehicle to accurately follow a planned trajectory.

Therefore, vehicle control parameters are fundamental for the control module to accurately follow a planned trajectory.

SUMMARY

Embodiments of the present disclosure provide a method for determining a vehicle control parameter, an apparatus for the same, a vehicle on-board controller and an autonomous vehicle.

In a first aspect, embodiments of the present disclosure disclose a method for determining a vehicle control parameter, the method comprising: determining a current vehicle speed and an expected acceleration; and determining, from a pre-generated parameter calibration table, a longitudinal control parameter corresponding to the current vehicle speed and the expected acceleration; wherein the parameter calibration table is obtained by: obtaining a training sample set, a training sample in the training sample set including the vehicle speed, the longitudinal control parameter and the acceleration; training a pre-established parameter calibration model with the vehicle speed and the acceleration of respective sample in the training sample set as inputs and the longitudinal control parameter value in the training sample as an expected output; and obtaining the parameter calibration table based on the trained parameter calibration model.

In some embodiments, a time point of collecting a training sample in the training sample set satisfies the following conditions: a steering angle of the vehicle is smaller than a preset steering angle threshold; a time point of collecting the acceleration in the training sample is delayed by a preset time interval from a time point of collecting the vehicle speed and the longitudinal control parameter value in the same training sample; and a variation of the longitudinal control parameter value is smaller than a preset variation threshold within a preset time period including the time point of collecting the training sample.

In some embodiments, obtaining the training sample set comprises: filtering accelerations collected by an inertia measuring unit of the vehicle to obtain the acceleration in the training sample set.

In some embodiments, obtaining the training sample set comprises: taking a vehicle speed outputted by a speed controller of the vehicle as the vehicle speed in the training sample set.

In some embodiments, obtaining a parameter calibration table based on the trained parameter calibration model comprises: discretizing correspondence relationships among the vehicle speed, the longitudinal control parameter, and the acceleration indicated by the trained parameter calibration model to obtain the parameter calibration table.

In a second aspect, embodiments of the present disclosure disclose an apparatus for determining a vehicle control parameter, the apparatus comprising: an obtaining unit configured for determining a current vehicle speed and an expected acceleration; and a parameter determining unit configured for determining, from a pre-generated parameter calibration table, a longitudinal control parameter corresponding to the current vehicle speed and the expected acceleration; wherein the parameter determining unit is further configured for obtaining the parameter calibration table by: obtaining a training sample set, a training sample in the training sample set including the vehicle speed, the longitudinal control parameter and the acceleration; training a pre-established parameter calibration model with the vehicle speed and the acceleration of respective sample in the training sample set as inputs and the longitudinal control parameter value in the training sample as an expected output; and obtaining the parameter calibration table based on the trained parameter calibration model; and obtaining the parameter calibration table based on the trained parameter calibration model.

In some embodiments, a time point of collecting a training sample in the training sample set satisfies the following conditions: a steering angle of the vehicle is smaller than a preset steering angle threshold; a time point of collecting the acceleration in the training sample is delayed by a preset time interval from a time point of collecting the vehicle speed and the longitudinal control parameter value in the same training sample; and a variation of the longitudinal control parameter value is smaller than a preset variation threshold within a preset time period including the time point of collecting the training sample.

In some embodiments, the parameter determining unit is further configured for filtering accelerations collected by an inertia measuring unit of the vehicle to obtain the acceleration in the training sample set.

In some embodiments, the parameter determining unit is further configured for taking a vehicle speed outputted by a speed controller of the vehicle as the vehicle speed in the training sample set.

In some embodiments, the parameter determining unit is further configured for discretizing correspondence relationships among the vehicle speed, the longitudinal control parameter, and the acceleration indicated by the trained parameter calibration model to obtain the parameter calibration table.

In a third aspect, embodiments of the present disclosure provide a vehicle on-board controller, comprising: one or more processors; storage means for storing one or more programs, wherein when the one or more programs are executed by the one or more processors, the one or more processors are caused to implement the method described according to the first aspect.

In a fourth aspect, embodiments of the present disclosure provide an autonomous vehicle, comprising a vehicle on-board controller described according to the third aspect.

In a fifth aspect, embodiments of the present disclosure provide a computer readable storage medium on which a computer program is stored, wherein the program, when being executed by a processor, implements the method described according to the first aspect.

By determining the current vehicle speed and the expected acceleration and then determining, from a pre-generated parameter calibration table, a longitudinal control parameter corresponding to the current vehicle speed and expected acceleration, the technical solution of determining a vehicle control parameter provided by the embodiments of the present disclosure may provide a reference value for the longitudinal control parameter at cold start for a certain class of vehicles with similar kinetic properties, such that the vehicle may reach a driving state indicated by a control purpose as accurately and quickly as possible.

BRIEF DESCRIPTION OF THE DRAWINGS

Other features, objectives, and advantages of the present disclosure will become more apparent through reading the detailed description of the non-limiting embodiments with reference to the drawings below.

DETAILED DESCRIPTION OF THE PREFERRED EMBODIMENTS

Figure 1:
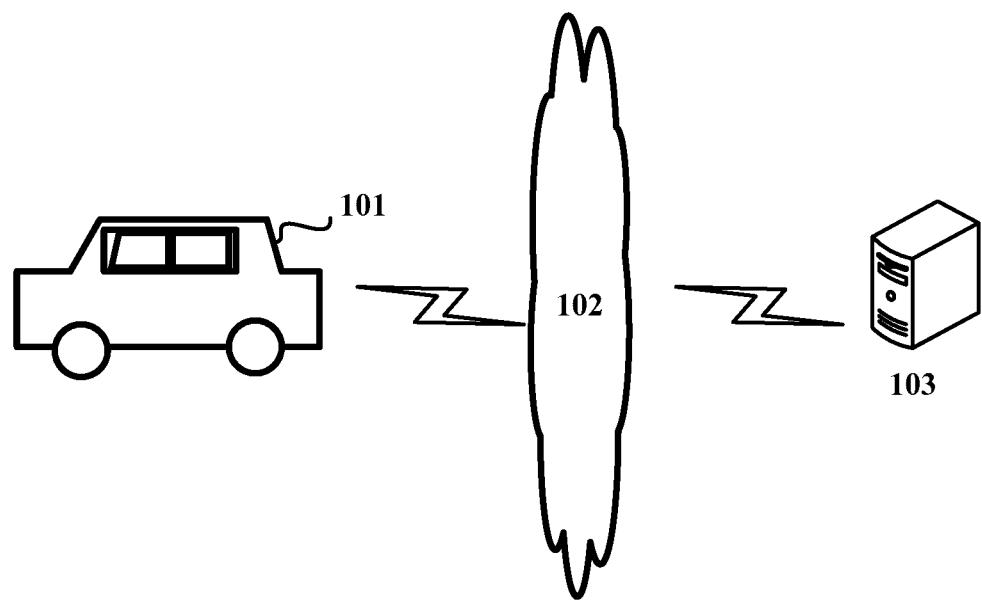
FIG. 1 is an exemplary system architecture diagram in which a method for determining a vehicle control parameter according to an embodiment of the present disclosure may be applied.

Hereinafter, the present disclosure will be described in further detail with reference to the accompanying drawings and the embodiments. It may be understood that the preferred embodiments described herein are only for illustrating the relevant invention, not for limiting the present disclosure. Additionally, it needs to be further noted that for the ease of depiction, only those parts related to the present disclosure are illustrated in the drawings.

Furthermore, it needs to be noted that without conflicts, the embodiments and the features in the embodiments of the present disclosure may be combined with each other. Hereinafter, the present disclosure will be described in detail with reference to the drawings in conjunction with the embodiments.

FIG. 1 illustrates an exemplary system architecture 100 in which embodiments of a method for determining a vehicle control parameter or an apparatus for determining a vehicle control parameter according to the present disclosure may be applied.

The system architecture 100 may comprise an autonomous vehicle 101, a network 102, and a server 103. The network 102 is configured as a medium for providing a communication link between the autonomous vehicle 101 and the server 103. The network 102 may comprise various connection types, e.g., a wired/wireless communication link or an optical fiber cable, etc.

The autonomous vehicle 101 may interact with the server 103 via the network 102 to receive or send messages, etc. Sensors like a vehicle radar, processors such as a vehicle brain, and various communication devices may be mounted on the autonomous vehicle 101.

The server 103 may be a server that provides various services, e.g., a server for processing the offset data collected by the autonomous vehicle 101. The server 103 may perform processing such as analyzing the received offset data, and return a processing result (e.g., a control signal of the autonomous vehicle) to the autonomous vehicle 101.

It needs to be noted that the method for determining a vehicle control parameter as provided by the embodiments of the present disclosure may be executed by the autonomous vehicle 101 or by the server 103 or partially by the autonomous vehicle 101 and partially executed by the server 103. Correspondingly, the apparatus for determining a vehicle control parameter may be provided in the server 103 or provided in the autonomous vehicle 101; or, part of the modules are provided in the server 103 while the remaining part are provided in the autonomous vehicle 101.

It should be understood that the numbers of autonomous vehicles 101, networks 102, and servers 103 in FIG. 1 are only schematic. Any numbers of autonomous vehicles 101, networks 102 and servers 103 may be provided according to implementation needs.

Figure 2:
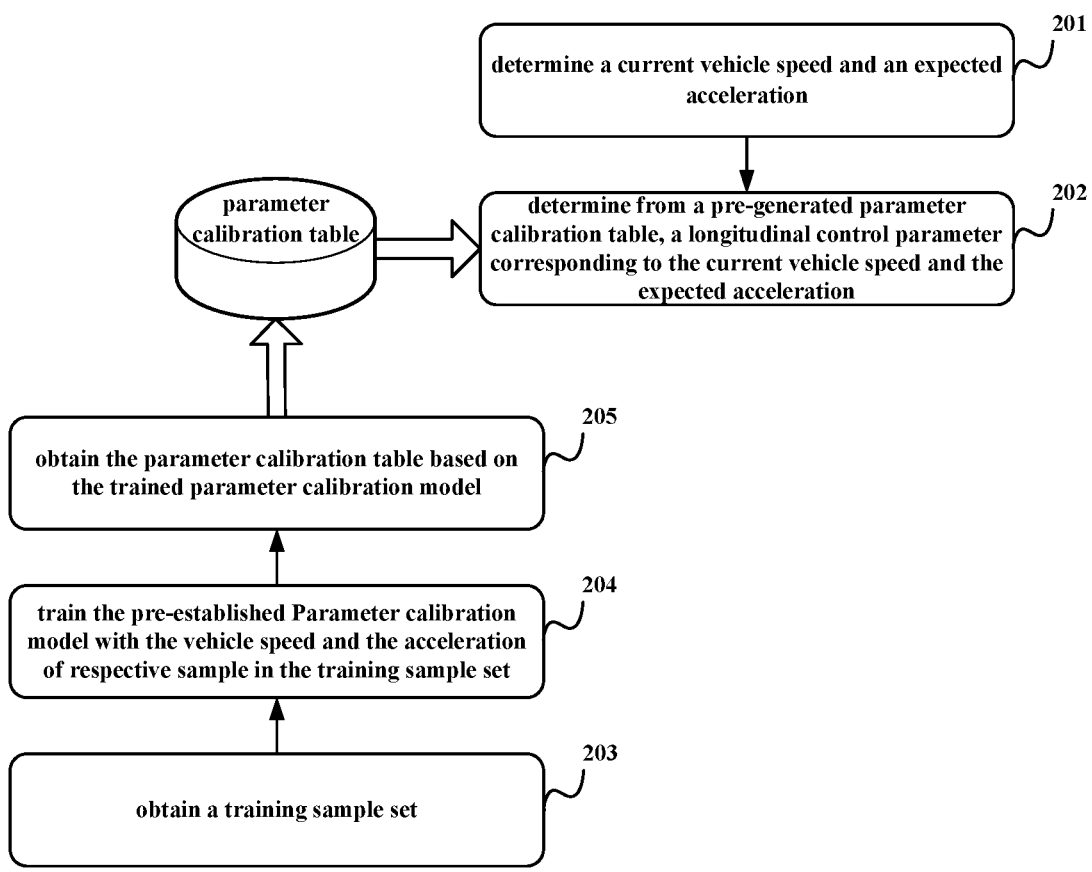
FIG. 2 is a flow chart of an embodiment of a method for determining a vehicle control parameter according to the present disclosure.

Now, continue to refer to FIG. 2, which shows a flow chart 200 of an embodiment of a method for determining a vehicle control parameter according to the present disclosure.

In various embodiments of the present disclosure, the vehicle control parameter may be any vehicle parameter that impacts a control signal outputted by any executing body (e.g., the autonomous vehicle 101 or server 103 as shown in FIG. 1) for controlling a vehicle to move and/or stop. In actual application scenarios, a mounting position of an IMU (Inertial Measurement Unit) and a zero-drift of the steering wheel all have a certain impact on the vehicle control parameter.

Besides, the vehicle mentioned in various embodiments of the present disclosure may refer to an unmanned vehicle or a manned vehicle in a self-driving state.

The method for determining a vehicle control parameter, comprising:

Step 201: determining a current vehicle speed and an expected acceleration.

Here, the current vehicle speed may refer to a current driving speed of the vehicle. The expected acceleration of the vehicle may be an acceleration which the vehicle is expected to reach as quickly as possible so as to achieve a certain control purpose (e.g., tracking a certain moving object, or parking before an intersection).

Step 202: determining, from a pre-generated parameter calibration table, a longitudinal control parameter corresponding to the current vehicle speed and the expected acceleration.

Here, the longitudinal control parameter may be understood as a control parameter required to be applied to the vehicle so as to reach the expected acceleration under a current driving speed (i.e., current vehicle speed).

The longitudinal control parameter of the vehicle may refer to any parameter that may change the driving speed of the vehicle, including, but not limited to, at least one of: a throttle opening, a braking depth (e.g., brake main cylinder pressure), a throttle/brake percentage (e.g., a percentage of the throttle opening over a throttle opening maximum value, and a percentage of the brake main cylinder pressure over the main cylinder pressure maximum value), etc.

The pre-generated parameter calibration table may include information for indicating correspondence relationships among the current vehicle speed, the expected acceleration, and the longitudinal control parameter.

The parameter calibration table may assume any feasible representation form. For example, in some optional implementation manners, the parameter calibration table may include a plurality of three-dimensional arrays. Each element in each three-dimensional array may characterize the current vehicle speed, the expected acceleration, or the longitudinal control parameter. For example, in the three-dimensional array [a, b, c], the element a characterizes the current vehicle speed, the element b characterizes the expected acceleration, while the element c characterizes a numerical value required to be applied to the longitudinal control parameter of the vehicle to reach the acceleration b when the vehicle is currently at the vehicle speed a.

Or, in some other optional implementation manners, the parameter calibration table may be characterized as a function expression with the current vehicle speed and the expected acceleration as independent variables and the longitudinal control parameter as a dependent variable. In such optional implementation manners, after the current vehicle speed and the expected acceleration are determined, a numerical value of the corresponding longitudinal control parameter may be solved based on the function expression.

In this way, once the current vehicle speed and the expected acceleration are determined, lookup and operation may be carried out in the parameter calibration table so as to obtain the longitudinal control parameter corresponding to the current vehicle speed and the expected acceleration.

In this embodiment, the parameter calibration table may be obtained through a flow below:

First, a training sample set is obtained in step 203. A training sample in the training sample set includes the vehicle speed, the longitudinal control parameter and the acceleration;

For example, numerical values of the vehicle speed and the acceleration at a certain time point may be collected by a speed sensor and an acceleration sensor installed on the vehicle. Besides, the longitudinal control parameter outputted by a control unit (e.g., a speed control) of the vehicle at the time point may be obtained. In this way, the collected speed and acceleration and the obtained longitudinal control parameter may form a training sample in the training sample set.

Next, in step 204, a pre-established parameter calibration model may be trained with the vehicle speed and the acceleration of respective sample in the training sample set as inputs and the longitudinal control parameter value in the training sample as an expected output.

Here, the parameter calibration model may assume any feasible form.

In some optional implementation manners, the parameter calibration model for example may be an SVM (Support Vector Machine) model. By selecting an appropriate kernel function and by training using the training sample set generated in step 203, the trained parameter calibration model may give the numerical value of the longitudinal control parameter corresponding to the current vehicle speed and the acceleration.

Next, at step 205, the parameter calibration table is obtained based on the trained parameter calibration model.

In this embodiment, the parameter calibration model is directly used as the parameter calibration table. Or, the parameter calibration table may be obtained after performing some processing to the parameter calibration model.

In some optional implementation manners, for example, the parameter calibration model is directly used as the parameter calibration table. In such optional implementation manners, the current vehicle speed and the expected acceleration may be inputted in the parameter calibration model, such that the parameter calibration model outputs the longitudinal control parameter corresponding to the current vehicle speed and the expected acceleration.

By determining the current vehicle speed and the expected acceleration and then determining, from a pre-generated parameter calibration table, the longitudinal control parameter corresponding to the current vehicle speed and expected acceleration, the method for determining a vehicle control parameter provided in this embodiment may provide a reference value for the longitudinal control parameter at cold start for a certain class of vehicles with similar kinetic properties, such that the vehicle may reach a driving state indicated by a control purpose as accurately and quickly as possible.

Figure 3:
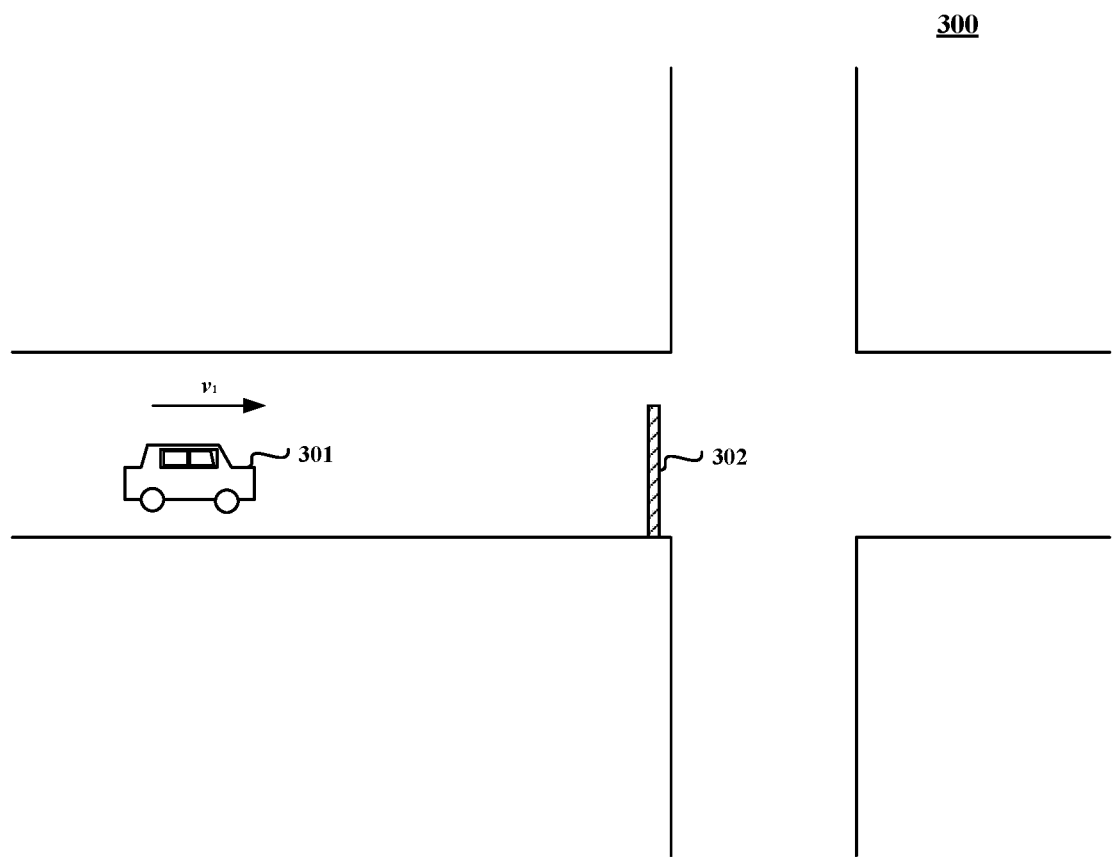
FIG. 3 is a schematic diagram of an application scenario for a method for determining a vehicle control parameter according to the present disclosure.

Continue to refer to FIG. 3, which shows a schematic diagram 300 of an application scenario for a method for determining a vehicle control parameter according to the present disclosure.

In the application scenario shown in FIG. 3, the current driving speed of the vehicle 301 is $v_1$, and it is expected that the vehicle brakes at an acceleration $a=-10$ m/s$^2$, such that the vehicle 301 may decelerate the vehicle speed to 0 at the stop line 302.

In this application scenario, search may be made in the parameter calibration table, so as to realize a brake depth value with an expected acceleration $a=-10$ m/se as quick as possible under the current driving speed $v_1$.

In some optional implementation manners of this embodiment, to train a parameter calibration model that may better represent the kinetic properties of a certain class of vehicles, the time point of collecting respective training sample in the training sample set for training the pre-established parameter calibration model may satisfy the following conditions:

a steering angle of the vehicle is smaller than a preset steering angle threshold; a time point of collecting the acceleration in the training sample is delayed by a preset time interval from the time point of collecting the vehicle speed and the longitudinal control parameter value in the same training sample; and a variation of the longitudinal control parameter value is smaller than a preset variation threshold within a preset time period including the time point of collecting the training sample.

It may be understood that when the vehicle is turning, part of the power of the vehicle will be used for implementing change of the vehicle azimuth. Therefore, in the case of collecting the vehicle speed, acceleration and longitudinal control parameter during turning of the vehicle, it is inappropriate to serve as the longitudinal control parameter corresponding to the current vehicle speed and acceleration because part of the vehicle power indicated by the longitudinal control parameter at this point will be used for changing the azimuth.

To avoid this problem, when collecting the training sample, the vehicle speed, acceleration, and corresponding longitudinal control parameter with an azimuth below a certain lower azimuth threshold may be collected.

Besides, due to existence of vehicle inertia, the vehicle acceleration that may be generated by the longitudinal control parameter at the time point t is always embodied after delaying for a certain time period (e.g., delayed by $\Delta t_{delay}$). Therefore, to represent the longitudinal control parameter and the attainable control purpose (e.g., acceleration) as accurately as possible, when collecting a training sample, a time point after delaying the time point of collecting the longitudinal control parameter and the vehicle speed by $\Delta t_{delay}$ may be taken as the time point of collecting the corresponding acceleration. For example, at the time point $t_0$, the vehicle speed collected is $v_0$ and the vehicle control parameter is $x_0$; at the time point $t_0 + \Delta t_{delay}$, the vehicle acceleration collected is $a_0$. Then, $[v_0, x_0, a_0]$ may serve as a training sample for training the parameter calibration model. It may be understood that the specific value of delayed $\Delta t_{delay}$ may be determined based on the weight of the vehicle and the response speed of the vehicle speed controller of the vehicle.

On the other hand, if an appreciable change occurs to the longitudinal control parameter during the time interval $[t_1, t_2]$, even the acceleration $a_0$ corresponding to the sampling time point $t_0$ within the time interval is collected after delaying by $\Delta t_{delay}$, it still cannot be determined whether the acceleration $a_0$ is generated by the longitudinal control parameter applied to the time $t_0$. Therefore, to enable the collected training sample to accurately characterize the longitudinal control parameter and the expected acceleration that may be generated by the longitudinal control parameter, a variation of the longitudinal control parameter value should be lower than a preset variation threshold within a preset time period (e.g., during the time period $[t_1, t_2]$, $t_1 \leq t_0 < t2$) including the time point (e.g., sampling time point $t_0$) of collecting the training sample.

Besides, in some optional implementation manners of this embodiment, the step 203 of obtaining the training sample set may further comprise: filtering accelerations collected by an inertia measuring unit of the vehicle to obtain the acceleration in the training sample set.

An IMU (Inertial Measurement Unit) is generally installed on an autonomous vehicle or a self-driving support vehicle so as to determine the acceleration of the vehicle, where data such as the posture of the vehicle are determined based on signals collected by the IMU. The IMU usually includes three single-axis accelerometer and three single-axis gyroscopes, wherein the accelerometers detect acceleration signals of the vehicle at three independent axes of the carrier coordinate system, while the gyroscopes may detect angular speed signals of the vehicle relative to the navigation coordinate system; by measuring the angular speed and the acceleration of an object in the three-dimensional space, the posture of the vehicle may be solved.

Besides, to eliminate a noise in the acceleration signal collected by the IMU, the acceleration signals collected by the IMU may be filtered to expect that the acceleration value as collected is more realistic and accurate.

In some application scenarios of such optional implementation manners, for example, the acceleration signals collected by the IMU may be filtered using a Butterworth filter.

Besides, in some optional implementation manners of this embodiment, the step 203 of obtaining the training sample set may further comprise: taking the vehicle speed outputted by the vehicle speed controller of the vehicle as the vehicle speed in the training sample set.

With the vehicle speed outputted by the vehicle speed controller at a certain time point as the vehicle speed at the time point of collecting a training sample, in the case that an executing body of the present method of determining the vehicle control parameter is integrated inside the vehicle on-board controller, the vehicle speed controller inside the vehicle on-board controller may directly output the current vehicle speed to the executing body to expect that the attained speed is more accurate with lower delay.

Figure 4:
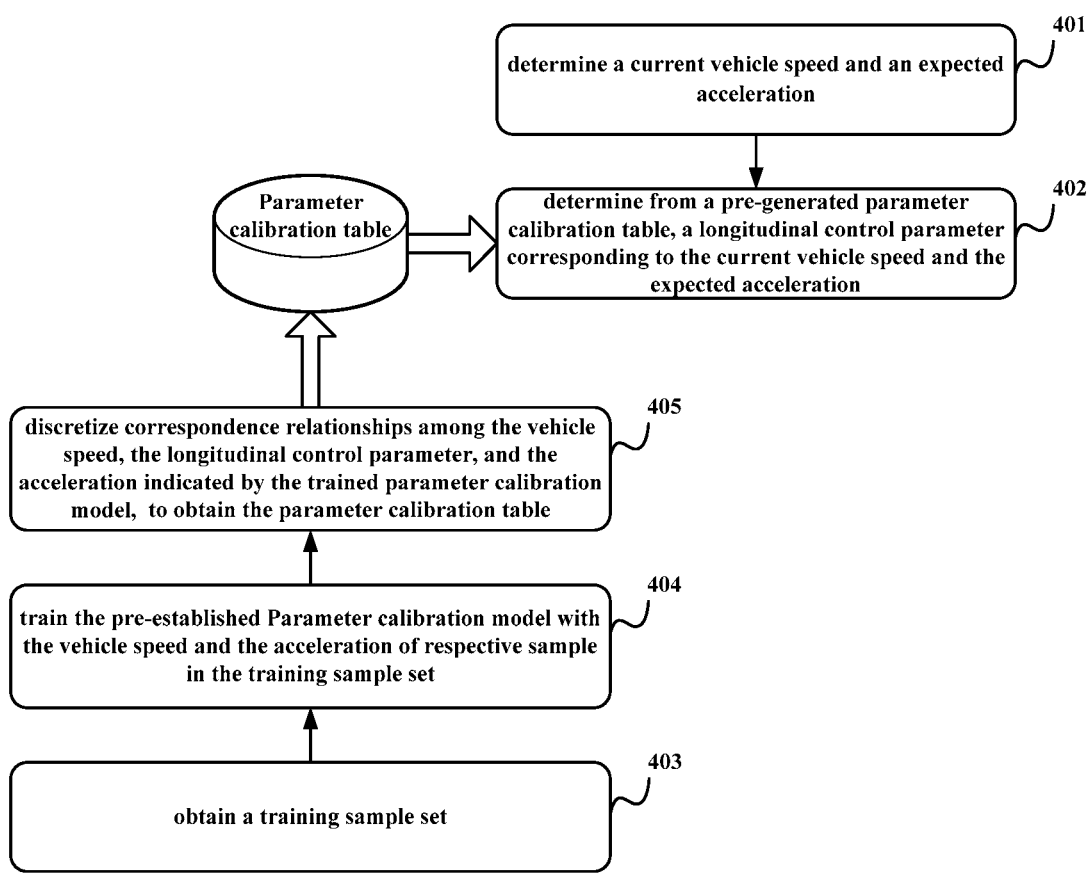
FIG. 4 is a flow chart of another embodiment of a method for determining a vehicle control parameter according to the present disclosure.

Now, continue to refer to FIG. 4, which shows a schematic flow chart 400 of another embodiment of a method for determining a vehicle control parameter according to the present disclosure.

The method for determining a vehicle control parameter, comprising:

Step 401: determining a current vehicle speed and an expected acceleration.

Step 402: determining, from a pre-generated parameter calibration table, a longitudinal control parameter corresponding to the current vehicle speed and the expected acceleration.

In this embodiment, the parameter calibration table may be obtained through a flow below:

First, a training sample set is obtained in step 403. A training sample in the training sample set includes the vehicle speed, the longitudinal control parameter and the acceleration;

Next, in step 404, a pre-established parameter calibration model may be trained with the vehicle speed and the acceleration of respective sample in the training sample set as inputs and the longitudinal control parameter value in the training sample as an expected output.

The steps 401~404 above may be executed in a manner similar to the steps 201~204 in the embodiment shown in FIG. 2. Besides, it may be understood that in the embodiment shown in FIG. 2, any optional implementation manners of step 201~step 204 may also be applied to step 401~step 404 of this embodiment.

However, different from the embodiment shown in FIG. 2, after obtaining the trained parameter calibration model, in step 405, correspondence relationships among the vehicle speed, the longitudinal control parameter, and the acceleration indicated by the trained parameter calibration model may be discretized to obtain the parameter calibration table.

In this embodiment, the trained parameter calibration model for example may be expressed as:

$$a = f(cmd, v) \quad (1)$$

Here, f(•) may be a function expression for characterizing the trained parameter calibration model. An expected acceleration value a may be obtained by subjecting the longitudinal control parameter cmd and the current vehicle speed v to the function operation f(•). Similarly, given the current vehicle speed v and the expected acceleration value a, the longitudinal control parameter cmd may be inversely solved.

In this embodiment, after obtaining the function expression f(•), it may be discretized to expect to reduce the computational amount for solving, from the f(•), the expected acceleration value a, the longitudinal control parameter cmd, and the current vehicle speed v, thereby reducing hardware resource consumption. In this way, given any two of the expected acceleration value a, the longitudinal control parameter cmd, and the current vehicle speed v, the corresponding remaining one may be found in the parameter calibration lookup table.

Compared with the method of determining a vehicle control parameter shown in FIG. 2, by discretizing the correspondence relationships among the vehicle speed, the longitudinal control parameter and the acceleration indicated by the trained parameter calibration model to obtain a parameter calibration table, the method for determining a vehicle control parameter in this embodiment may reduce the computational amount required for determining the remaining one given any two of the expected acceleration value a, the longitudinal control parameter cmd, and the current vehicle speed v, so as to save the computational resources of the executing body as much as possible.

Figure 5:
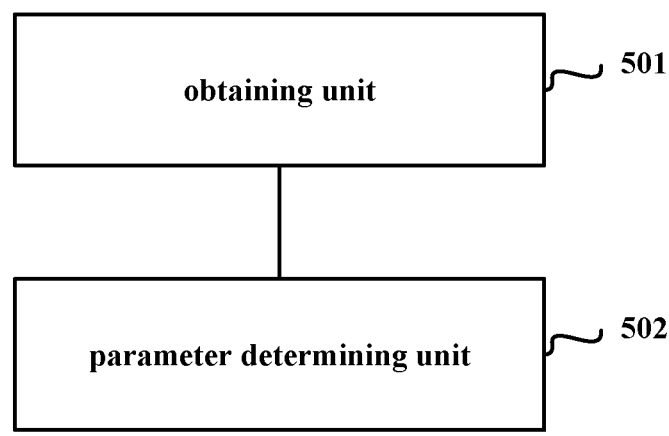
FIG. 5 is a structural diagram of an embodiment of an apparatus for determining a vehicle control parameter according to the present disclosure.

Further refer to FIG. 5. To implement the methods shown in respective drawings above, the present disclosure provides an embodiment of an apparatus for determining a vehicle control parameter. The apparatus embodiment corresponds to the method embodiment shown in FIG. 2. The apparatus may be specifically applied to various electronic devices.

As shown in FIG. 5, the apparatus for determining a vehicle control parameter comprises an obtaining unit 501 and a parameter determining unit 502, wherein:

the obtaining unit 501 may be configured for determining a current vehicle speed and an expected acceleration;

the parameter determining unit 502 may be configured for determining, from a pre-generated parameter calibration table, a longitudinal control parameter corresponding to the current vehicle speed and the expected acceleration.

The parameter determining unit 502 may be further configured to obtain a parameter calibration table by: obtaining a training sample set, a training sample in the training sample set including the vehicle speed, the longitudinal control parameter and the acceleration; training a pre-established parameter calibration model with the vehicle speed and the acceleration of respective sample in the training sample set as inputs and the longitudinal control parameter value in the training sample as an expected output; and obtaining the parameter calibration table based on the trained parameter calibration model.

In some embodiments, a time point of collecting the training sample in the training sample set satisfies the following conditions: a steering angle of the vehicle is smaller than a preset steering angle threshold; a time point of collecting the acceleration in the training sample is delayed by a preset time interval from a time point of collecting the vehicle speed and the longitudinal control parameter value in the same training sample; and a variation of the longitudinal control parameter value is smaller than a preset variation threshold within a preset time period including the time point of collecting the training sample.

In some optional implementation manners, the parameter determining unit 502 may be further configured for filtering accelerations collected by an inertia measuring unit of the vehicle to obtain the acceleration in the training sample set.

In some optional implementation manners, the parameter determining unit 502 may be further configured for taking a vehicle speed outputted by a speed controller of the vehicle as the vehicle speed in the training sample set.

In some optional implementation manners, the parameter determining unit 502 may be further configured for discretizing correspondence relationships among the vehicle speed, the longitudinal control parameter, and the acceleration indicated by the trained parameter calibration model to obtain the parameter calibration table.

Figure 6:
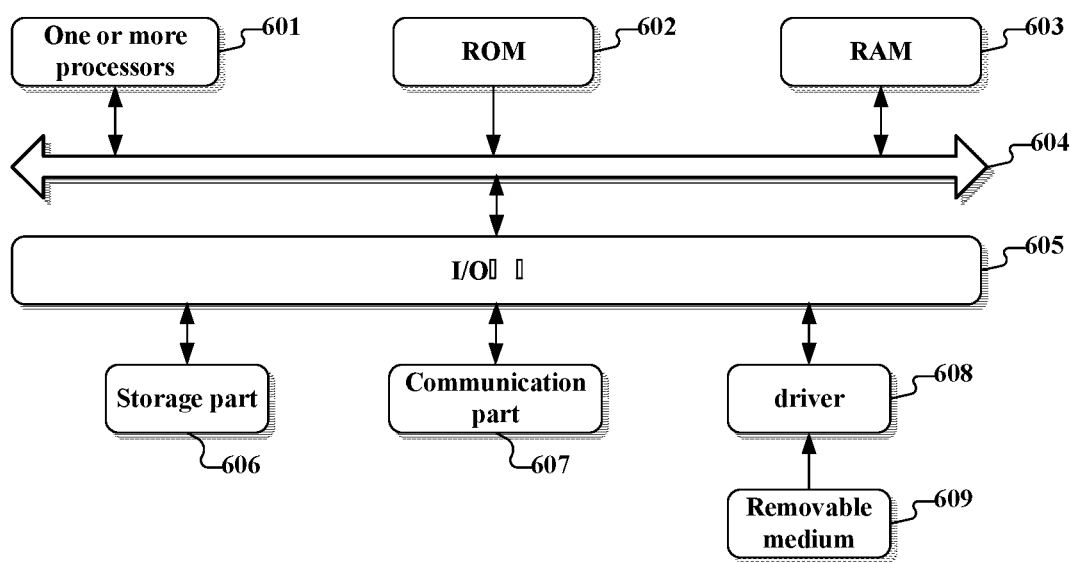
FIG. 6 is a structural schematic diagram of a computer system of an electronic device adapted for implementing a method for determining a vehicle control parameter according to the embodiments of the present disclosure.

Now refer to FIG. 6, which shows a structural schematic diagram of a computer system 600 of an electronic device (e.g., an on-board controller) adapted for implementing a method for calibrating a vehicle control parameter according to the embodiments of the present disclosure. The electronic device shown in FIG. 6 is only an example, which should not constitute any limitation to the function and use scope of the embodiments of the present disclosure.

As shown in FIG. 6, the computer system 600 comprises one or more processors 601 which may perform various kinds of appropriate actions and processing according to computer program instructions stored in a read-only memory (ROM) 602 or a program loaded into the random-access memory (RAM) 603 from a memory part 606. In RAM 603, there may also store various kinds of programs and data needed for operations of the system 600. CPU 601, ROM 602, and RAM 603 are connected with each other via a bus 604 The input/output (I/O) interface 605 may also be connected to the bus 604.

The following components are connected to the I/O interface 605, including: a memory part 606 including a hard disk, etc.; and a communication part 607 including a network interface card such as a LAN (Local Area Network) card, a modem, etc. The communication part 607 performs communication processing via a network such as the Internet. The driver 608 is also connected to the I/O interface 605 as needed. A removable medium 609, such as a magnetic disk, an optical disk, a magneto-optical disk, and a semiconductor memory, etc., is mounted on the driver 608 as needed, so as to facilitate the computer program read therefrom to be installed in the memory part 606.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 607, and/or installed from a removable medium 609. When being executed by the central processing unit (CPU) 601, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program codes are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program codes embodied on the computer-readable medium may be transmitted using any appropriate medium, including, but not limited to: wireless, wired, cable, RF, etc., or any appropriate combination thereof.

Computer readable program instructions for carrying out operations of the present invention may be compiled in one or more programming languages, the programming languages including object-oriented programming languages such as Java, Smalltalk, C++ or the like, as well as conventional procedural programming languages, such as the "C" programming language or similar programming languages. The computer codes may be executed entirely on the user's computer, partially on the user's computer, executed as a stand-alone software package, and partially on the user's computer and partially executed on a remote computer, or entirely executed on the remote computer or server. In a scenario involving a remote computer, the remote computer may be connected to the user's computer through any type of network, including a local area network (LAN) or a wide area network (WAN), or the connection may be made to an external computer (for example, through the Internet using an Internet Service Provider).

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks may be actually executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the embodiments of the present disclosure may be implemented by software or by hardware. The units as described may also be provided in a processor. For example, they may be described as: a processor comprising an obtaining unit and a parameter determining unit. Particularly, names of these units do not constitute a limitation to the units per se in some circumstances. For example, the obtaining unit may also be described as "a unit for determining a current vehicle speed and an expected acceleration."

As another aspect, the present disclosure provides an autonomous vehicle, comprising an on-board controller described above. It may be understood that the autonomous vehicle may also include a sensing device such as IMU and a power device such as an engine, etc. These devices may all be implemented using the prior art, which will not be detailed here.

As another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: determine a current vehicle speed and an expected acceleration; determine, from a pre-generated parameter calibration table, a longitudinal control parameter corresponding to the current vehicle speed and the expected acceleration; wherein the parameter calibration table is obtained by: obtaining a training sample set, a training sample in the training sample set including the vehicle speed, the longitudinal control parameter and the acceleration; training a pre-established parameter calibration model with the vehicle speed and the acceleration of respective sample in the training sample set as inputs and the longitudinal control parameter value in the training sample as an expected output; and obtaining the parameter calibration table based on the trained parameter calibration model.

What have been described above are only preferred embodiments of the present disclosure and an illustration of the technical principle as exploited. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for determining a vehicle control parameter, comprising:
    determining a current vehicle speed and an expected acceleration;
    determining, from a pre-generated parameter calibration table, a longitudinal control parameter corresponding to the current vehicle speed and the expected acceleration;
    wherein the parameter calibration table is obtained by:
        obtaining a training sample set, a training sample in the training sample set including the vehicle speed, the longitudinal control parameter and the acceleration;
        training a pre-established parameter calibration model with the vehicle speed and the acceleration of respective samples in the training sample set as inputs and the longitudinal control parameter value in the training sample as an expected output; and
        obtaining the parameter calibration table based on the trained parameter calibration model.

2. The method according to claim 1, wherein a time point of collecting a training sample in the training sample set satisfies the following conditions:
    a steering angle of the vehicle is smaller than a preset steering angle threshold;
    a time point of collecting the acceleration in the training sample is delayed by a preset time interval from a time point of collecting the vehicle speed and the longitudinal control parameter value in the same training sample; and a variation of the longitudinal control parameter value is smaller than a preset variation threshold within a preset time period including the time point of collecting the training sample.

3. The method according to claim 2, wherein the obtaining a training sample set comprises:
filtering accelerations collected by an inertia measuring unit of the vehicle to obtain the acceleration in the training sample set.

4. The method according to claim 2, wherein the obtaining a training sample set comprises:
taking a vehicle speed outputted by a speed controller of the vehicle as the vehicle speed in the training sample set.

5. The method according to claim 1, wherein obtaining the parameter calibration table based on the trained parameter calibration model comprises:
discretizing correspondence relationships among the vehicle speed, the longitudinal control parameter, and the acceleration indicated by the trained parameter calibration model to obtain the parameter calibration table.

6. An apparatus for determining a vehicle control parameter, comprising:
an obtaining unit configured for determining a current vehicle speed and an expected acceleration;
a parameter determining unit configured for determining, from a pre-generated parameter calibration table, a longitudinal control parameter corresponding to the current vehicle speed and the expected acceleration;
wherein the parameter determining unit is further configured to obtain the parameter calibration table by:
obtaining a training sample set, a training sample in the training sample set including the vehicle speed, the longitudinal control parameter and the acceleration;
training a pre-established parameter calibration model with the vehicle speed and acceleration of respective sample in the training sample set as inputs and the longitudinal control parameter value in the training sample as an expected output; and
obtaining the parameter calibration table based on the trained parameter calibration model.

7. The apparatus according to claim 6, wherein a time point of collecting a training sample in the training sample set satisfies the following conditions:
a steering angle of the vehicle is smaller than a preset steering angle threshold;
a time point of collecting the acceleration in the training sample is delayed by a preset time interval from a time point of collecting the vehicle speed and the longitudinal control parameter value in the same training sample; and
a variation of the longitudinal control parameter value is smaller than a preset variation threshold within a preset time period including the time point of collecting the training sample.

8. The apparatus according to claim 7, wherein the parameter determining unit is further configured for:
filtering accelerations collected by an inertia measuring unit of the vehicle to obtain the acceleration in the training sample set.

9. The apparatus according to claim 7, wherein the parameter determining unit is further configured for:
taking a vehicle speed outputted by a speed controller of the vehicle as the vehicle speed in the training sample set.

10. The apparatus according to claim 6, wherein the parameter determining unit is further configured for:
discretizing correspondence relationships among the vehicle speed, the longitudinal control parameter, and the acceleration indicated by the trained parameter calibration model to obtain the parameter calibration table.

11. A vehicle controller, comprising:
one or more processors;
non-transitory storage means for storing one or more programs, wherein
when the one or more programs are executed by the one or more processors, the one or more processors are caused to implement actions, the actions comprising:
determining a current vehicle speed and an expected acceleration;
determining, from a pre-generated parameter calibration table, a longitudinal control parameter corresponding to the current vehicle speed and the expected acceleration;
wherein the parameter calibration table is obtained by:
obtaining a training sample set, a training sample in the training sample set including the vehicle speed, the longitudinal control parameter and the acceleration;
training a pre-established parameter calibration model with the vehicle speed and the acceleration of respective samples in the training sample set as inputs and the longitudinal control parameter value in the training sample as an expected output; and
obtaining the parameter calibration table based on the trained parameter calibration model.

12. An autonomous vehicle, comprising:
a vehicle on-board controller, the vehicle on-board controller comprising:
one or more processors;
non-transitory storage means for storing one or more programs, wherein
when the one or more programs are executed by the one or more processors, the one or more processors are caused to implement actions, the actions comprising:
determining a current vehicle speed and an expected acceleration;
determining, from a pre-generated parameter calibration table, a longitudinal control parameter corresponding to the current vehicle speed and the expected acceleration;
wherein the parameter calibration table is obtained by:
obtaining a training sample set, a training sample in the training sample set including the vehicle speed, the longitudinal control parameter and the acceleration;
training a pre-established parameter calibration model with the vehicle speed and the acceleration of respective samples in the training sample set as inputs and the longitudinal control parameter value in the training sample as an expected output; and
obtaining the parameter calibration table based on the trained parameter calibration model.

13. A non-transitory computer-readable memory medium on which a computer program is stored, wherein the program, when executed by a processor, causes the processor to perform actions, the actions comprising:

determining a current vehicle speed and an expected acceleration;
determining, from a pre-generated parameter calibration table, a longitudinal control parameter corresponding to the current vehicle speed and the expected acceleration;
wherein the parameter calibration table is obtained by:
  obtaining a training sample set, a training sample in the training sample set including the vehicle speed, the longitudinal control parameter and the acceleration;
  training a pre-established parameter calibration model with the vehicle speed and the acceleration of respective samples in the training sample set as inputs and the longitudinal control parameter value in the training sample as an expected output; and
  obtaining the parameter calibration table based on the trained parameter calibration model.

* * * * *